(12) United States Patent
Gutiérrez Diez et al.

(10) Patent No.: US 9,120,449 B2
(45) Date of Patent: Sep. 1, 2015

(54) SELF-SUPPORTED CUSHION ASSEMBLY FOR AN INTERIOR VEHICLE PART

(71) Applicant: GRUPO ANTOLIN-INGENIERIA, S. A, Burgos (ES)

(72) Inventors: Héctor Gutiérrez Diez, Burgos (ES); Adelaida Antolín Fernández, Burgos (ES); Omar Lugo Rodriguez, Burgos (ES)

(73) Assignee: GRUPO ANTOLIN-INGENIERIA, S.A., Burgos (ES)

( * ) Notice: Subject to any disclaimer, the term of this patent is extended or adjusted under 35 U.S.C. 154(b) by 0 days.

(21) Appl. No.: 13/958,148

(22) Filed: Aug. 2, 2013

(65) Prior Publication Data

US 2014/0077517 A1    Mar. 20, 2014

(30) Foreign Application Priority Data

Sep. 14, 2012 (EP) .................................... 12382357

(51) Int. Cl.
*B60N 2/46* (2006.01)
*B60R 21/04* (2006.01)
*B60N 2/70* (2006.01)
*B60N 2/72* (2006.01)

(52) U.S. Cl.
CPC ............... *B60R 21/04* (2013.01); *B60N 2/466* (2013.01); *B60N 2/70* (2013.01); *B60N 2/72* (2013.01)

(58) Field of Classification Search
CPC ............. B60N 2/70; B60N 2/72; B60N 2/466

USPC .................................................. 296/153, 1.09
See application file for complete search history.

(56) References Cited

U.S. PATENT DOCUMENTS

| 3,770,318 | A | * | 11/1973 | Fenton | ............ 297/452.47 |
| 5,589,245 | A | * | 12/1996 | Roell | ................. 428/85 |
| 7,607,730 | B2 | * | 10/2009 | Moseneder | ....... 297/218.3 |
| 2005/0200161 | A1 | | 9/2005 | Reed et al. | |
| 2006/0200960 | A1 | | 9/2006 | Reed et al. | |

FOREIGN PATENT DOCUMENTS

| DE | 2851348 | * | 7/1979 |
| JP | 2001314287 | | 11/2001 |

OTHER PUBLICATIONS

European Search Report corresponding to EP Application No. 12382357.7 dated Mar. 15, 2013.

\* cited by examiner

*Primary Examiner* — Dennis H Pedder
(74) *Attorney, Agent, or Firm* — Banner & Witcoff, Ltd.

(57) ABSTRACT

Self-supported cushion assembly for an interior vehicle part which comprises a tridimensional fabric, a rigid plate and a main frame. The tridimensional fabric is the element which simultaneously performs the cushion and decorative functions of the self-supported cushion assembly and it is supported on the rigid plate which is in turn, supported on the main frame. The main frame is the part of the frame of the interior vehicle part that transmits the efforts to the interior vehicle part and links the self-supported cushion assembly to the interior vehicle part.

19 Claims, 6 Drawing Sheets

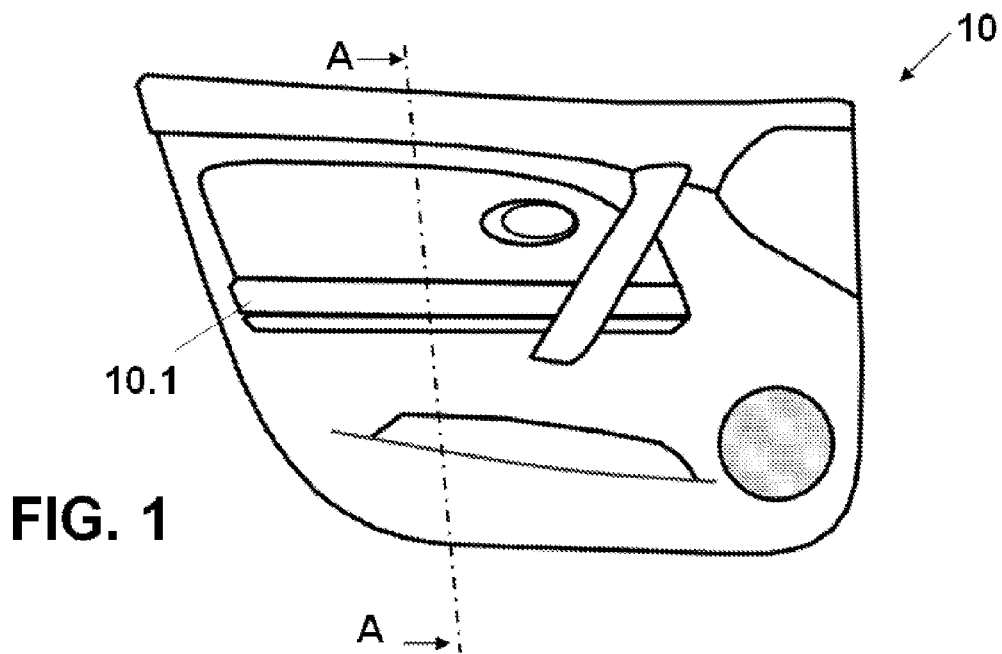
FIG. 1
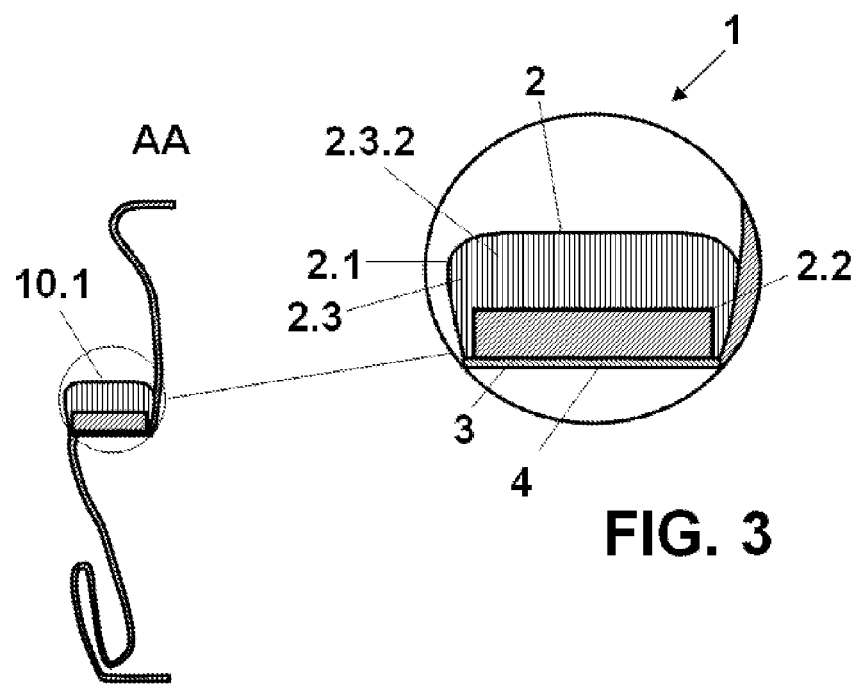
FIG. 2
FIG. 3 ered by reference herein in its entirety.
SELF-SUPPORTED CUSHION ASSEMBLY FOR AN INTERIOR VEHICLE PART The present application claims the benefit or priority of EP 12382357.7, filed Sep. 14, 2012 which is incorporated by reference herein in its entirety.

TECHNICAL FIELD

The present invention refers to a self-supported cushion assembly for an interior vehicle part having a tridimensional fabric as main cushioning element.

BACKGROUND

It is quite common to find inside the vehicles several parts which comprise a cushion device in order to improve the vehicle user's comfort.

Said interior vehicle parts are used as support elements by the vehicle user, for example, an armrest of a door trim panel which supports the vehicle user's arm.

For that reason, this kind of parts commonly has one or more cushion elements as part of its structure, for example a foam element or similar.

On the other hand, said interior vehicle parts apart from comprising a support element which support the efforts derived from the normal use and from its attaching they need to have a decorative element which offers an attractive appearance due to they are visible to the occupants inside the vehicle interior.

Therefore, these interior vehicle parts have three main functions, a supporting efforts function, a cushion function and decorative function.

Normally, the structure of those interior vehicle parts comprise a different element in order to fulfill each of the functions described above, that is, one element as support efforts element, a second element as cushion element and a third element as decorative element.

This, apart from complicating and making expensive the structure of the interior vehicle part, it has a negative effect on the weight of it.

On the other hand, normally said interior vehicle parts which have a cushion function, have uniform rigidity along the whole interior vehicle part because said interior vehicle parts do not allow to locally control its rigidity depending on the functions demanded to such interior vehicle parts. For example it should not behave in the same way the area of the armrest where the elbow is supported than the area of the armrest where the forearm is supported.

Therefore it is desirable to find a self-supported cushion element with a simpler structure, lighter and that allow to control the rigidity of the cushion element in a localized way.

Interior vehicle parts which have a cushion function normally comprise a laminate formed by a support element, a cushion element and a decorative element which finishes the structure.

Those structures are complicated and expensive due to the number of elements which form part of them and to the manufacturing process of such structures.

On the other hand this kind of structures is heavy due to the number of elements comprised by them and their weight.

Apart from this, known structures do not allow to control the rigidity of the cushion element in a localized way.

American patents US2005200161 and US2006200960 disclose interior vehicle parts according to that described above.

BRIEF SUMMARY

In view of the above described, this invention refers to a self-supported cushion assembly for an interior vehicle part comprising:
  a main frame
  a rigid plate supported on the main frame
  a tridimensional fabric supported on the rigid plate
  Wherein the tridimensional fabric comprises
  a back knitted layer lying on the rigid plate,
  a shaping knitted layer,
  a core layer having spacer yarns which connect the back knitted layer with the shaping knitted layer,
in such a way that all of them are knitted together as a sole element,
  the tridimensional fabric comprises two different cushion areas defined and delimited by a correspondent change area adjacent to both of them where the thickness of said change area is lower than the thicknesses of such two different cushion areas,
  the tridimensional fabric has first attaching means in order to peripherally attach the tridimensional fabric edges to the main frame and /or to the rigid plate,
  the shaping knitted layer is tightened to constrain the core layer against the rigid plate giving in this way the external shape to the self-supported cushion assembly,
  an edge of the shaping knitted layer being peripherally attached to the main frame and/or to the rigid plate by means of the first attaching means -wrapping a peripheral edge of the rigid plate,
  the back knitted layer having second attaching means in order to fix the back knitted layer with the rigid plate.

Due to the configuration of the invention it is possible to integrate more than one function using less elements than in known cushioned interior vehicles parts of the prior art. This way the tridimensional fabric acts at the same time as cushion element and as decorative element.

This last feature implies a lighter and cheaper structure than known structures of the prior art based on foams and lining covers and it also implies a mounting simplification of the self-supported cushion assembly as well.

On the other hand, it is possible to control the rigidity of the tridimensional fabric which forms part of the self-supported cushion assembly in a locally way by acting on its features either, the shaping knitted layer, the core layer, the back knitted layer or any of them.

BRIEF DESCRIPTION OF THE DRAWINGS

This specification is supplemented with a set of drawings illustrating the preferred embodiments, which are never intended to limit the current invention.

FIG. 1 shows a full view of a vehicle interior part where the interior vehicle part is a door panel.

FIG. 2 shows a schematic view of the section AA corresponding to the door trim panel having a cushioned armrest.

FIG. 3 shows a schematic view in detail of the cushioned armrest according to the section AA, said cushioned armrest having a structure formed by a tridimensional fabric, a rigid plate and a main frame where is also appreciated the different layers which form part of the tridimensional fabric, in particular, a shaping knitted layer forming the top of the tridimensional fabric, a back knitted layer forming the bottom of the tridimensional fabric and a core layer formed by spacer yarns which connect the back knitted layer to the shaping knitted layer in such a way that said three layers are knitted all together as a sole element.

DETAILED DESCRIPTION OF THE PREFERRED EMBODIMENTS

Figure 4:
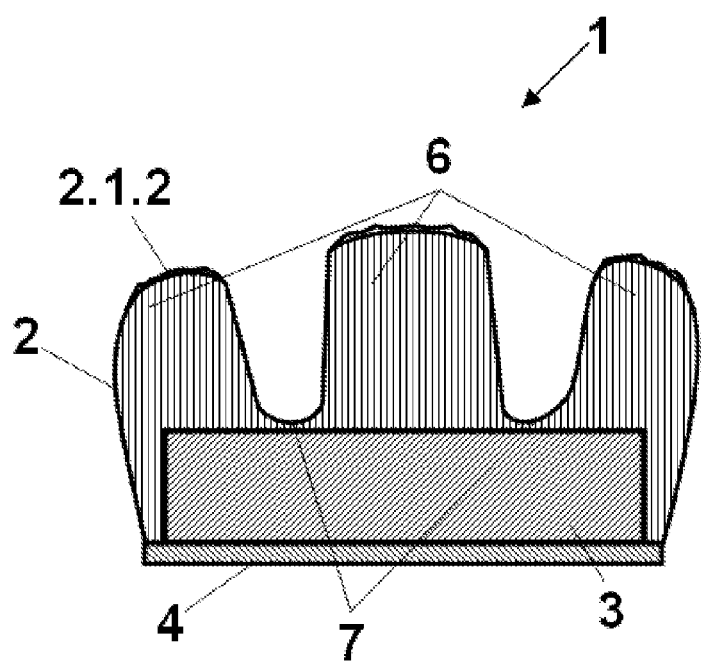
FIG. 4 shows a schematic view in detail of the cushioned armrest according to the section AA where it can be appreciated that the tridimensional fabric is divided into different cushion areas defined and delimited by correspondent change areas adjacent to them where the thickness of these change areas is lower than the thicknesses of such cushion areas.

A self-supported cushion assembly (1) is mounted on a vehicle interior part (10), in this particular embodiment as it can be seen in FIG. 1 and FIG. 2 the self-supported cushion assembly (1) is mounted on a door trim panel (10), and particularly on the armrest (10.1) of the door trim panel (10).

Other cushioned interior vehicle parts could be suitable for mounting the self-supported cushion assembly (1) of the invention such as dash boards, rear shelves, pillars, seat backrests, sunvisors, etc.

As it can be seen in FIG. 3, the structure of the self-supported cushion assembly (1) comprises a tridimensional fabric (2), a rigid plate (3) and a main frame (4).

The tridimensional fabric (2) is the element which simultaneously performs the cushion and decorative functions of the self-supported cushion assembly (1).

The tridimensional fabric (2) is supported on the rigid plate (3) and it has first attaching means (8) in order to attach the tridimensional fabric (2) edges to the rigid plate (3) and/or to the main frame (4) of the interior vehicle part (10), as it is described in detail below.

These first attaching means (8) can be whatever of the known fixing means of the prior art such as profiles, hooks, reinforcing holes or a peripheral frame.

In a preferred embodiment, the tridimensional fabric (2) before being attached to the main frame has a thickness greater than 20 mm as such, that is greater than what is commonly used in the tridimensional fabrics for other known applications of the prior art.

This specific feature of the tridimensional fabric (2) is particularly advantageous for those cases in which comfort is a key target either when a part of an occupant body lays on the self-supported cushion assembly for long periods of time or to soften light impacts of the occupant body on it.

On the other hand this increased thickness avoids undesirable effects such as uncomfortable rebounding of the part of the user body supported on the self-supported cushion assembly.

The rigid plate (3) supports the common efforts for instance when user body is lying on it.

The rigid plate (3) is supported on the main frame (4) and it is attached to said main frame (4) by means of third attaching means (not represented) which are commonly used and known in the prior art such as clipping, clamping, riveting, sticking, etc.

Optionally, the rigid plate (3) can be shaped in such a way that when the tridimensional fabric (2) is attached to it, they jointly define the final shape of the whole self-supported cushion assembly (1).

Additionally the rigid plate (3) can comprise channels (not represented) in order to house other elements as wiring, fixing, etc. between the rigid plate (3) and the tridimensional fabric (2).

The last element which forms part of the main structure of the self-supported cushion assembly is the main frame (4).

This main frame (4) is also part of the frame of the interior vehicle part (10) and transmits the efforts to the interior vehicle part (10) and links the self-supported cushion assembly (1) to the interior vehicle part (10).

The tridimensional fabric (2), as it can be seen in FIG. 3, is formed by three layers knitted all together as a sole element, particularly a back knitted layer (2.2) which lies on the rigid plate (3), a shaping knitted layer (2.1) which forms the external side visible to the occupants of the self-supported cushion assembly (1) and a core layer (2.3), sandwiched between the shaping knitted layer and the back knitted layer, which has spacer yarns (2.3.2) which connect the back knitted layer (2.2) with the shaping knitted layer (2.1).

The shaping knitted layer (2.1) is tightened to constrain the core layer (2.3) against the rigid plate (3) giving in this way the external shape to the self-supported cushion assembly (1).

For this, an edge (2.1.1) of the shaping knitted layer (2.1) is peripherally attached to the main frame (4) and/or to the rigid plate (3) wrapping a peripheral edge (3.1) of the rigid plate (3) as it is explained in detail below.

Optionally, the shaping knitted layer (2.1) can have an additional finishing treatment (8) by screen printing, ink printing, polyurethane or silicone spraying, flocking, or by a combination of these methods on specific areas in order to modify or to improve its external appearance or toughness.

Optionally, it is possible to define different finishing areas (2.1.2) by applying any of the different finishing methods of the shaping knitted layer (2.1). This way, more than one finishing area (2.1.2) can be defined on the shaping knitted layer (2.1) by using one or more of the techniques described above, in order to divide the shaping knitted layer (2.1) into more than one finishing area (2.1.2).

On the other hand, the shaping knitted layer (2.1) may also have different finishing areas (2.1.2) with different features by using different knitting (9), by using different yarn material, or both of them.

As it has been explained above, back knitted layer (2.2) lies on the rigid plate (3) and is connected to the shaping knitted layer (2.1) by means of the core layer (2.3) in order to form the tridimensional fabric (2) as a sole knitted element.

The back knitted layer (2.2) is attached to the rigid plate by second attaching means (9). These attaching means are also known in the prior art and they can be selected among hook-and-loop fastener, sticking, clamping, stapling, clipping, riveting, screwing and thermofusing.

Like the shaping knitted layer (2.1) both, the back knitted layer (2.2) and the core layer (2.3), may have different features at specific areas for example by using different knitting, by using different yarn material or both of them.

In the case of the core layer (2.3) this aspect is particularly important because the different features of the core layer (2.3) at specific areas can define different cushion areas (6) also with different features of the self-supported cushion assembly and which are described in detail below.

In the particular embodiment shown in FIG. 4, the tridimensional fabric (2) comprises three different cushion areas (6) defined and delimited by two correspondent change areas (7) adjacent to them where the thicknesses of said change areas (7) are lower than the thicknesses of any of such three different cushion areas (6).

This reduction of thickness of the change areas (7) with regard to the cushion areas (6) can be achieved for example by joining together the shaping knitted layer (2.1) and the back knitted layer (2.2) at the change areas (7) in such a way that one layer is in contact with the other one. Therefore, in these cases, the change areas (7) can be even free of spacer yarns (2.3.2) of the core layer (2.3).

On the other hand, this reduction of thickness can be also achieved for example thanks to specific properties of the spacer yarns (2.3.2) of the core layer (2.3). Therefore in these cases, the spacer yarns (2.3.2) of the core layer (2.3) sews and brings the shaping knitted layer (2.1) closer to the back knitted layer (2.2).

The change areas (7) can be attached to the rigid plate (3) by the second attaching means (9) described above. However the tridimensional fabric (2) can be attached to the rigid plate (3) either at the change areas (7), at other areas of the tridimensional fabric (2) different from the change areas (7), or along the whole contact area between the tridimensional fabric (2) and the rigid plate (3).

The cushion areas (6) can present the particularity of having different rigidities between them, in such a way it is possible to control the rigidity of every specific cushion area through varying the core layer (2.3) properties such as its elasticity or its thickness, for example by varying the distribution and/or disposition of the spacer yarns (2.3.2), their properties or both of them.

On the other hand, the cushion areas (6) can be differentiated one from each other by the different finishes of their shaping knitted layers (2.1).

The techniques for achieving the different finishes at these cushion areas (6) can be the same used in order to modify shaping knitted layer (2.1) described above in order to obtain the different finishing areas (2.1.2), however said finishing areas (2.1.2) may not necessarily coincide with the cushion areas (6).

Once the features of the self-supported cushion assembly and all the elements which form its structure are described, the different ways considered of attaching said elements, particularly the ways of attaching the edges of the tridimensional fabric (2) to the rigid plate (3) and/or to the main frame (4) are explained below.

Figure 5:
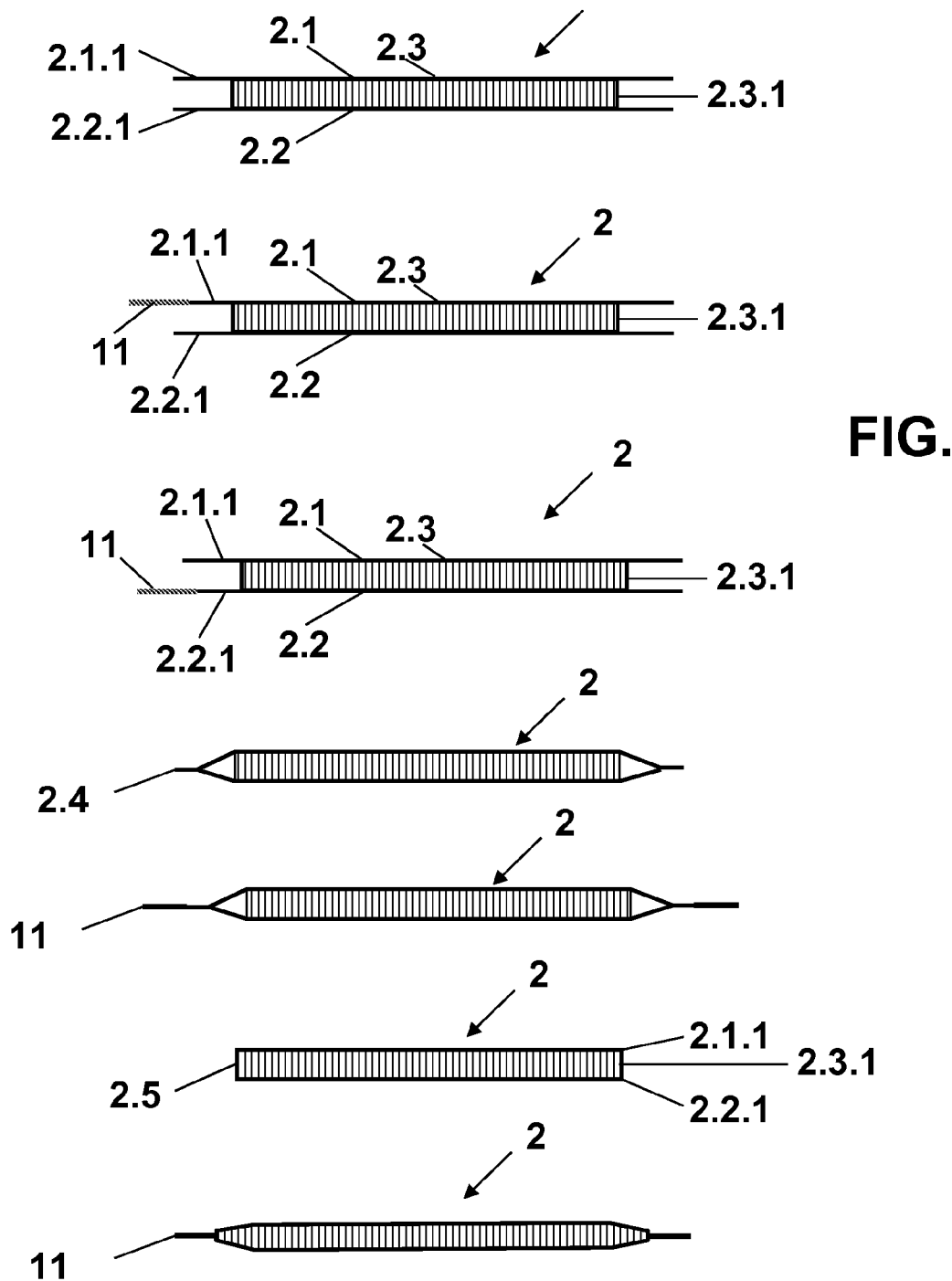
FIGS. 5 shows several schematic views in section of the tridimensional fabric where it can be appreciated the different finishing options of the edges of the shaping knitted layer, of the core layer and of the back knitted layer which form part of it.

Firstly it is important to know how the edges of the different layers of the tridimensional fabric (2) can be, as it is shown in FIG. 5.

The first option considered in order to define the edges of the tridimensional fabric (2) is one in which an edge (2.1.1) of the shaping knitted layer (2.1) and the corresponding edge (2.2.1) of the back knitted layer (2.2) protrude peripherally with regard to the corresponding edge (2.3.1) of the core layer (2.3).

The second option considered is one in which an edge (2.1.1) of the shaping knitted layer (2.1) and the corresponding edge (2.2.1) of the back knitted layer (2.2) are fixed together forming a first sole edge (2.4).

The third option considered is one in which an edge (2.1.1) of the shaping knitted layer (2.1) and the corresponding edge (2.2.1) of the back knitted layer (2.2) do not protrude peripherally with regard to the corresponding edge (2.3.1) of the core layer (2.3) in such a way these three edges (2.1.1, 2.2.1, 2.3.1) form a second sole edge (2.5).

In all of the cases described above, a reinforcing part (11) can be attached either to the edge (2.1.1) of the shaping knitted layer (2.1), to the corresponding edge (2.2.1) of the back knitted layer (2.2), to the first sole edge (2.4) or to the second sole edge (2.5).

This reinforcing part (11) facilitates the operation of attaching the tridimensional fabric (2) to the main frame (4) and/or to the rigid plate (3) because it reinforces the edges of the tridimensional fabric (2) and consequently it improves the handling of the tridimensional fabric (2).

Once the different options considered in order to define the edges of the tridimensional fabric (2) have been described, the different ways of attaching the tridimensional fabric (2) edges to the rigid plate (3) and/or to the main frame (4), by the first attaching means (8) are described below.

These different ways of attaching the tridimensional fabric (2) to the main frame (4) and/or to the rigid plate (3) will be selected in function of the available space in the interior vehicle part (10), the configuration of the main frame (4) and/or the thickness of the tridimensional fabric (2).

Figure 6:
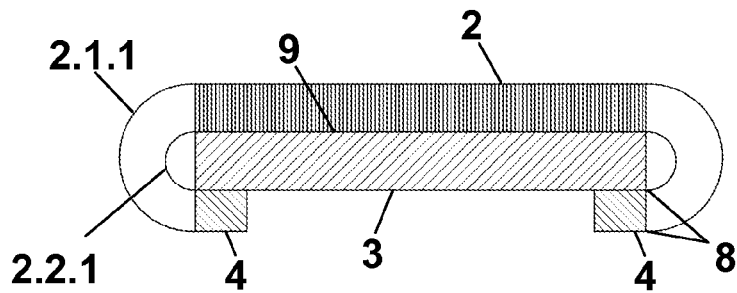
FIG. 6 shows a schematic view in section of the self-supported cushion assembly where it can be appreciated a first way of attaching of the tridimensional fabric edges to the rest of elements which form part of the self-supported cushion assembly. In this particular option, an edge of the shaping knitted layer is attached to the main frame and an edge of the back knitted layer is attached to the rigid plate.

FIG. 6 shows a first way of attaching the tridimensional fabric (2) to the main frame (4) and to the rigid plate (3). In this option, the edge (2.1.1) of the shaping knitted layer (2.1) is attached to the main frame (4) and the edge (2.2.1) of the back knitted layer (2.2) is attached to the rigid plate (3).

Figure 7:
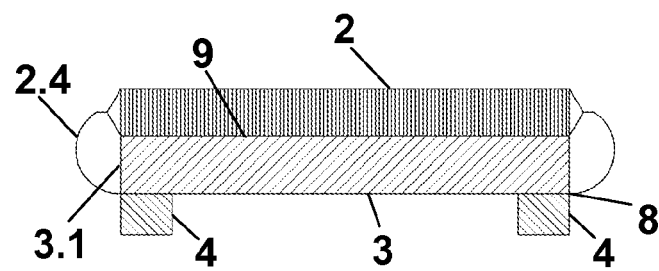
FIG. 7 shows a schematic view in section of the self-supported cushion assembly where it can be appreciated a second way of attaching of the tridimensional fabric edges to the rest of elements which form part of the self-supported cushion assembly. In this particular option, a first sole edge is attached to the rigid plate, where said first sole edge comprises an edge of the shaping knitted layer and an edge of the back knitted layer joined together.

FIG. 7 shows a second way of attaching the tridimensional fabric (2) to the rigid plate (3). In this option, the first sole edge (2.4) is attached to the rigid plate (3).

Figure 8:
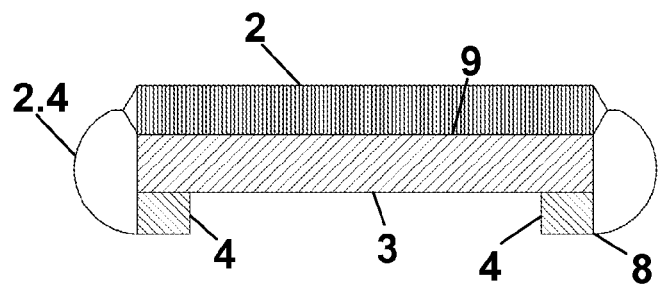
FIG. 8 shows a schematic view in section of the self-supported cushion assembly where it can be appreciated a third way of attaching of the tridimensional fabric edges to the rest of elements which form part of the self-supported cushion assembly. In this particular option, a first sole edge is attached to the main frame, where said first sole edge comprises an edge of the shaping knitted layer and an edge of the back knitted layer joined together.

FIG. 8 shows a third way of attaching the tridimensional fabric (2) to the main frame (3). In this option, the first sole edge (2.4) is attached to the main frame (3).

Figure 9:
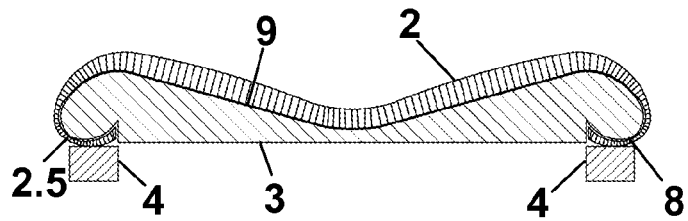
FIG. 9 shows a schematic view in section of the self-supported cushion assembly where it can be appreciated a fourth way of attaching of the tridimensional fabric edges to the rest of elements which form part of the self-supported cushion assembly. In this particular option, a second sole edge is attached to the rigid plate, where said second sole edge comprises an edge of the shaping knitted layer, an edge of the back knitted layer and an edge of the core layer joined together.

FIG. 9 shows a fourth way of attaching the tridimensional fabric (2) to the rigid plate (3). In this option, the second sole edge (2.5) is attached to the rigid plate (3).

Figure 10:
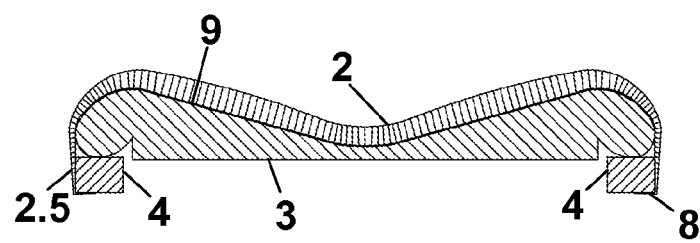
FIG. 10 shows a schematic view in section of the self-supported cushion assembly where it can be appreciated a fifth way of attaching of the tridimensional fabric edges to the rest of elements which form part of the self-supported cushion assembly. In this particular option, a second sole edge is attached to the main frame, where said second sole edge comprises an edge of the shaping knitted layer, an edge of the back knitted layer and an edge of the core layer joined together.
Figure 11:
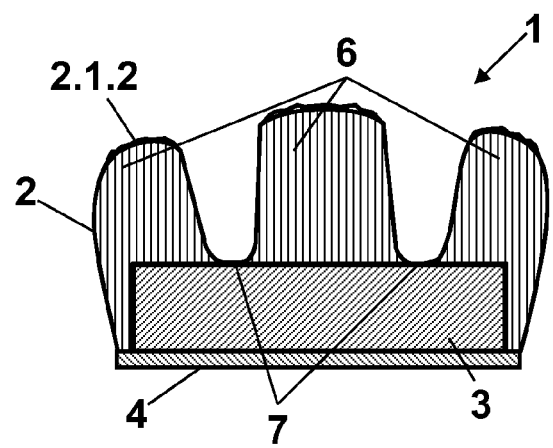
FIG. 11 shows a schematic view in detail of the cushioned armrest according to the section AA.
Figure 12:
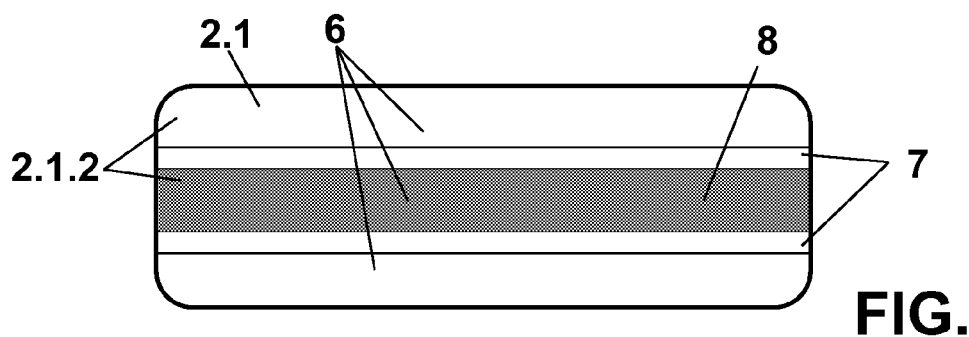
FIG. 12 shows a top view of the self-supported cushion layer wherein the finishing of the shaping knitted layer has an additional finishing treatment (8).
Figure 13:
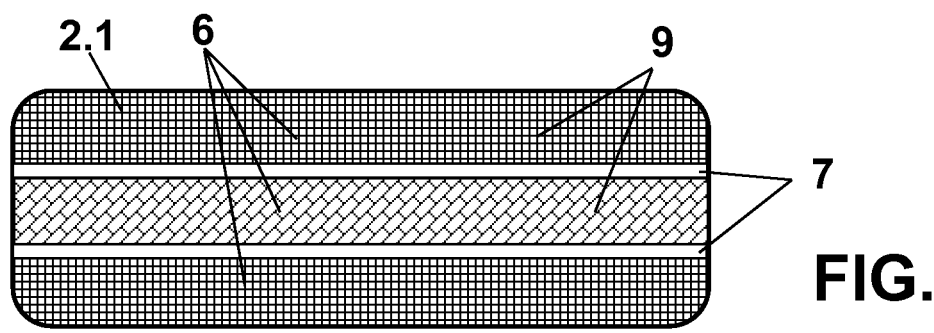
FIG. 13 shows a top view of the self-supported cushion layer wherein the finishing of the shaping knitted layer has different features by using different knitting (9).

FIG. 10 shows a fifth way of attaching the tridimensional fabric (2) to the main frame (4). In this option, the second sole edge (2.5) is attached to the main frame (4).

The invention claimed is:

1. A self-supported cushion assembly for an interior vehicle part comprising
   a main frame
   a rigid plate supported on the main frame
   a tridimensional fabric supported on the rigid plate,
   Wherein the tridimensional fabric comprising
   a back knitted layer lying on the rigid plate,
   a shaping knitted layer,
   a core layer having spacer yarns which connect the back knitted layer with the shaping knitted layer,
   in such a way that all of them are knitted all together as a sole element wherein,
   the tridimensional fabric comprises two different cushion areas defined and delimited by a correspondent change area adjacent to both of them where the thickness of said change area is lower than the thicknesses of such two different cushion areas,
   the back knitted layer and the shaping knitted layer are joined together at the
   change areas in such a way, one layer is in contact with the other one,
   the tridimensional fabric has first attaching means in order to attach the tridimensional fabric edges to the main frame, and/or to the rigid plate, or to the main frame and to the rigid plate,
   the shaping knitted layer is tightened to constrain the core layer against the rigid plate giving in this way the external shape to the self-supported cushion assembly,
   an edge of the shaping knitted layer being peripherally attached to the main frame, and/or to the rigid plate, or to the main frame and to the rigid plate, by means of the first attaching means wrapping a peripheral edge of the rigid plate,
   the back knitted layer having second attaching means in order to attach the back knitted layer with the rigid plate.

2. The self-supported cushion assembly for an interior vehicle part according to claim 1, wherein an edge of the shaping knitted layer and an edge of the back knitted layer protrude peripherally with regard to an edge of the core layer.

3. The self-supported cushion assembly for an interior vehicle part according to claim 2, wherein the edge of the shaping knitted layer and the edge of the back knitted layer are fixed together forming a first sole edge.

4. The self-supported cushion assembly for an interior vehicle part according to claim 1, wherein an edge of the shaping knitted layer and an edge of the back knitted layer do not protrude peripherally with regard to an edge of the core layer in such a way the three edges form a second sole edge.

5. The self-supported cushion assembly for an interior vehicle part according to claim 2, wherein the edge of the shaping knitted layer is attached to the main frame and the edge of the back knitted layer is attached to the rigid plate.

6. The self-supported cushion assembly for an interior vehicle part according to claim 4, wherein the second sole edge is attached to the main frame or to the rigid plate.

7. The self-supported cushion assembly for an interior vehicle part according to claim 2, wherein a reinforcing part is attached to the edge of the shaping knitted layer, to edge of the back knitted layer, to the first sole edge or to the second sole edge.

8. The self-supported cushion assembly for an interior vehicle part according to claim 1, wherein the first attaching means are selected between at least one of profiles, hooks, reinforcing holes and peripheral frame.

9. The self-supported cushion assembly for an interior vehicle part according to claim 1, wherein the second attaching means are selected between at least one of hook-and-loop fastener, sticking, clamping, stapling clipping, riveting, screwing and thermofusing.

10. The self-supported cushion assembly for an interior vehicle part according to claim 1, wherein the second attaching means attach the tridimensional fabric to the rigid plate either at the change areas, at other areas of the tridimensional fabric different from the change areas or along the whole contact area between the tridimensional fabric and the rigid plate.

11. The self-supported cushion assembly for an interior vehicle part according to claim 1, wherein the core layers of two cushion areas have different thicknesses, different elasticities, or both of them.

12. The self-supported cushion assembly for an interior vehicle part according to claim 1, wherein the shaping knitted layer of two cushion areas have different finishes.

13. The self-supported cushion assembly for an interior vehicle part according to claim 1, wherein the finishing of the shaping knitted layer has an additional finishing treatment by screen printing, ink printing, polyurethane or silicone spraying, flocking, or by a combination of these methods on specific areas.

14. The self-supported cushion assembly for an interior vehicle part according to claim 1, wherein the shaping knitted layer has different finishing with different features by either using different knitting, by using different yarn material or both of them.

15. The self-supported cushion assembly for an interior vehicle part according to claim 13, wherein the shaping knitted layer is divided into at least two finishing areas.

16. The self-supported cushion assembly for an interior vehicle part according to claim 3, wherein a reinforcing part is attached to the first sole edge.

17. The self-supported cushion assembly for an interior vehicle part according to claim 4, wherein a reinforcing part is attached to the second sole edge.

18. The self-supported cushion assembly for an interior vehicle part according to claim 1, wherein the tridimensional fabric has a thickness greater than 20 mm.

19. The self-supported cushion assembly for an interior vehicle part according to claim 1, wherein the rigid plate is shaped in such a way that when the tridimensional fabric is attached to it, they jointly define the final shape of the whole self-supported cushion assembly.

* * * * *